Feb. 3, 1953 J. B. EDWARDS 2,627,373
PRECALCULATION SELECTOR
Filed June 8, 1949 2 SHEETS—SHEET 1

INVENTOR.
J. B. Edwards

Feb. 3, 1953    J. B. EDWARDS    2,627,373
PRECALCULATION SELECTOR
Filed June 8, 1949    2 SHEETS—SHEET 2

INVENTOR.
J. B. Edwards

Patented Feb. 3, 1953

2,627,373

UNITED STATES PATENT OFFICE 2,627,373

PRECALCULATION SELECTOR

Jones B. Edwards, Charlotte, N. C.

Application June 8, 1949, Serial No. 97,740

14 Claims. (Cl. 235—87)

This invention relates in general to calculating methods and devices, and more particularly to a calculating method and device relatively simple and economical in construction, and simple and speedy in operation, utilizing precalculated tables to indicate results rather than the methods and more complex and costly mechanisms of conventional calculating machines in general use.

A further object is to provide a more efficient method and means of determining the result or answer of the more complex calculations which for greater convenience are conventionally represented by tables or charts, as for instance, amounts of Income Tax to be withheld from wages, interest tables, special price charts, rate tables, and many other special tables and charts.

Another object is to provide a most efficient and economical method and means of determining payroll calculations, being a distinct advance over the best present methods for calculating the amount of wages from hours and rate per hour, or for piece work, from quantity and rate.

An additional object is to provide a method and apparatus of the above nature having a case carrying an index plate or keyboard, said case having a series of openings or windows therein, movable means to which desired tables may be affixed, stops located at intervals on said movable means and corresponding to the layout of said index plate, whereby key or stop means operated at any position of said index plate will, when said movable means is actuated, cause a corresponding position on said movable means to stop at said operated index position, revealing the sought result or answer in said openings or windows in the case.

It is understood that these limited fields of specific description are employed solely for purposes of illustrating the novelty and utility of the device in several important phases, therefore, having in view these and other objects, purposes and uses as may appear or be hereinafter pointed out, a form in which the invention may be conveniently embodied in practice has been illustrated on the accompanying drawings, in which.

Figure 3:
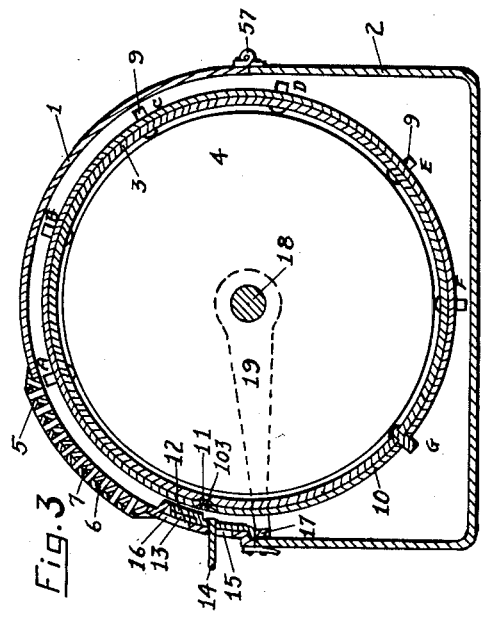
Figure 3 is a sectional elevation approximately on the line 3—3 of Figure 1.

Referring now to Sheet 1 of the drawing, the device is shown as essentially consisting of an index plate 7, having a series of holes therein arranged in columns, and index 5 having imprinted thereon any suitable series of index characters, such as numerals, a rotatable drum 3 having affixed thereon any suitable table 10 of characters designed as calculated results corresponding with the factors represented by index characters, said drum 3 having located at intervals thereon suitable stops A, B, C, etc., in line with the respective columns of index plate 7, a case top 1 upon which index plate 7 is mounted, said case top 1 having suitable openings or windows 16 therein suitably designated as factors in desired calculations and in line with the columns of the index plate 7, the windows 16 having shutters 12 operated by respective keys 14, a shutter reset bar 17 mounted on arms 19 and 20 turning freely on sleeve 29, said shutter reset bar 17 also serving the function of releasing drum latch 24 when any of the keys 14 should be depressed, spring means 97 and associated parts for actuating the drum 3, reset means 44 and associated parts for resetting the drum and shutters after each operation, a ratchet gear 27 with pawl 49 and associated parts which serve to prevent rebound of the drum 3 when operated, and a peg-key 101, which is inserted in any one desired of the holes 6 serving to stop drum 3 when rotated at that index position as one of the stops A, B, C, etc., located on drum 3 meets this obstacle. The index 5 and table 10 are readily removable and the device may be fitted with any suitable table and index for a desired purpose.

In order to render a clear explanation of the operation of the device it will be necessary to use a definite index and associated table in illustration, and one of the currently used official wage bracket tables for determining the amount of income tax to be withheld from wages affords an effective means for this purpose.

For instance, the weekly table has 84 wage bracket items, which for the purposes of this illustration are imprinted on index 5 arranged in columns of 10 units to each column, counting from top to bottom of each column and successively from one column to another from left to right. Only the "At Least" figures of the wage bracket need be shown on index 5.

Figure 1:
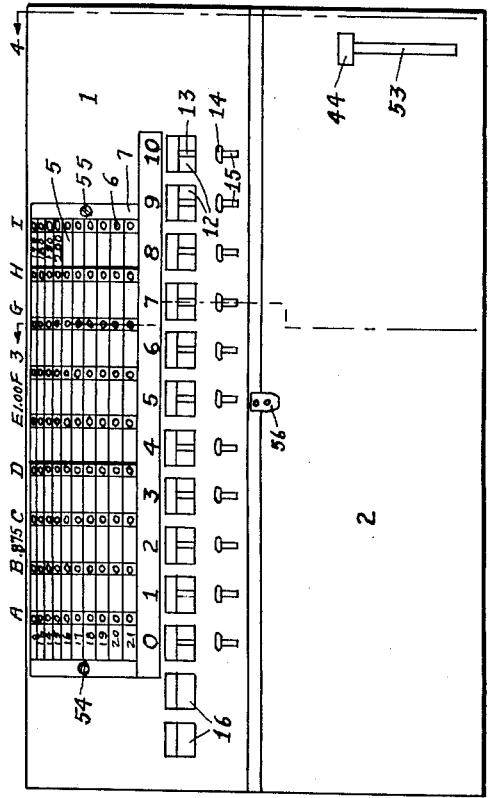
Figure 1 is a front elevation.
Figure 2:
Figure 2 is a fragmentary front view partly in section approximately on the line 2—2 of Figure 4, the front part of the case having been removed to show the interior mechanism.
Figure 2:
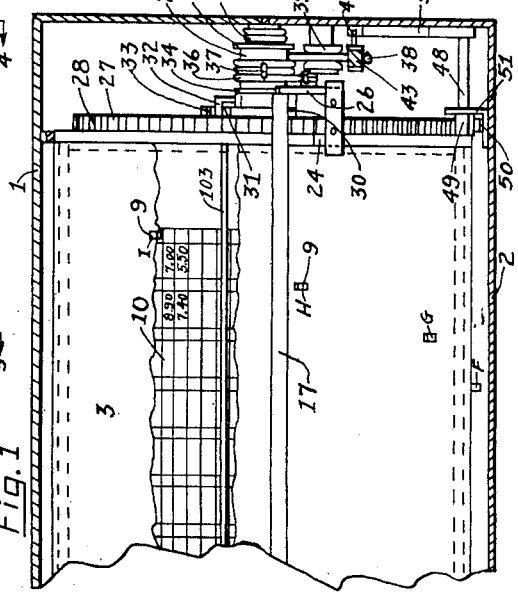
Figure 5:
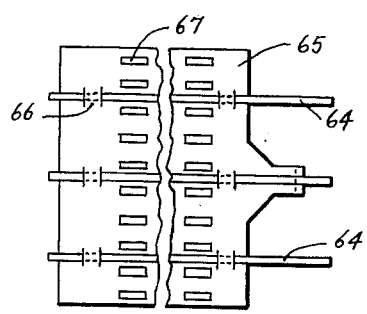
Figure 5 is a fragmentary view of a key-lock plate.
Figures 6, 7:
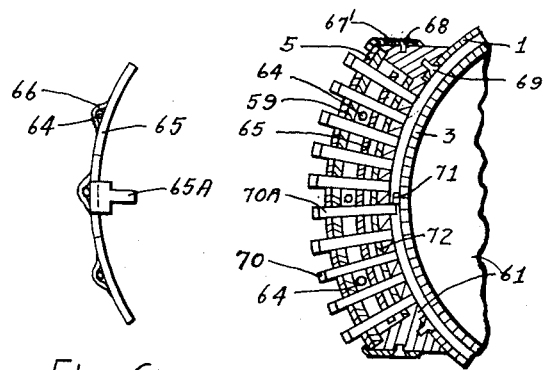
Figure 6 is an end elevation of Figure 5.
Figure 7 is a fragmentary sectional view approximately along the line 7—7 of Figure 8, relative sizes of parts being distorted to clearly illustrate the construction.

The windows 16 are numbered 0 to 10 as shown in Figure 1, corresponding to the number of withholding exemptions claimed. A table 10 having the same content and arrangement of the said weekly wage bracket table, with line and column spacings corresponding with those used for index 5 is affixed to drum 3, the ends of said table 10 being held in place by bar 103, the ends of which are sprung into holes 102 in the rim at each end of drum 3. Said table 10 may also bear both wage bracket amounts at the left, viz. "At Least" and "But Less Than," for which windows 16 are provided as shown in Figure 1, giving a visible check on correct index selection when the device has been operated. It is understood, of course, that indices and tables for other payroll periods, such as biweekly, semimonthly, monthly, etc., may with equal facility be used with this device.

In operation, for example, if it be desired to determine the withholding tax to be deducted from wages of $50.86 with 3 exemptions, the peg-key is inserted in hole 6 at the index figure 50 (At Least $50 But Less Than $51) and the window shutter key 14 is depressed for window 3. Depresssing key 14 in addition to opening shutter 12 downward operates bar 17 and pin 21 on arm 20 releasing drum latch 24. This permits drum 3 to be revolved by action of spring 97 operating through flexible cable 41 or other suitable means affixed to shaft 18. Stop D is located horizontally on drum 3 in line with index 5 column D and is located circumferentially on the drum so that if stopped at the top position of index 5 column D, wage bracket "At Least $42 But Less Than $43" would show in windows 16 at left of the machine. However, as peg-key 101 has been inserted at index position $50 the drum 3 revolves until stop D encounters the end of peg-key 101, and windows 16 at left of the device shows (At Least) $50 (But Less Than) $51, and window 16 column 3 shows $1.80, the amount of withholding tax to be deducted from wages. The drum 3 does not rebound when stop D encounters peg-key 101, for on the instant of impact pawl 49 has engaged a tooth 28 of ratchet gear 27 preventing any kick-back. After each operation the drum 3 and other operated parts are reset to normal or beginning position by depressing lever 44, whereby pin 47 operates lever 52 to release pawl 49 from ratchet gear 27, permitting drum 3 to be revolved backward as continued downward movement of lever 44 through flexible cable 36 or other suitable means anchored to sleeve 29 by pin 37 operates reset sleeve 29, which turns freely on shaft 18, and lug 31 attached to sleeve 29 at some point in its revolution engages pin 33 to revolve drum 3 backward, and near end of downward movement of lever 44, engages lug 32 affixed to arm 20 to reset window shutter 12 and permit drum latch 24 to relock drum 3. Upon release of lever 44 it is returned to normal position through action of spring 99 attached to flexible cable 36 or other suitable means. In a subsequent operation the peg-key 101 is removed from the previous index position and placed in a hole 6 of any other desired index position. The device practical for this purpose may be constructed of a size approximately six inches long, four and one quarter inches deep and five inches high.

It will be noted that the selection of one factor of a problem in a particular column in index 5 bears no indicated relation to which window 16 will reveal the desired results, as the particular window 16 is selected according to a second factor in the said problem. Generally speaking, the table 10 affixed to drum 3 is arranged so that one factor of the problem is in sequence from beginning to end, the index 5 showing this factor arranged in columns, and each line of the table 10 carries the various answers of its particular index factor in relation to the second factor of the problem. However, in some instances this is modified to the extent that the column of index 5 in which a part of the first factor of a problem is located may indicate the second factor, and the particular window 16 in which the answer is revealed may indicate a part of the first factor of the problem, as will appear in the following example.

The device practical for determining calculations of wages from a first factor, hours and tenth-hours, and a second factor, rate per hour, may be constructed of a size approximately twelve inches long, four and one-quarter inches deep and five inches high. For this purpose the index 5 is arranged by columns of ten as in the previous example, in sequences of forty, representing one to forty hours, for five sequences. Then each sequence of forty, or four columns of the index 5, constitutes a wage rate. For instance, five rates might be eighty-seven and one-half cents, one dollar, one dollar twelve and one-half cents, on dollar and twenty-five cents, and one dollar and fifty cents, requiring twenty index columns. There will then be two index windows 16 and twenty result windows 16, numbered 0 to 9 and 0 to 9 or two sequences of ten each, representing tenth-hours. The table 10 would have two parallel sets of figures, one hundred index lines per set, with ten columns each, corresponding to the windows 16 of two results sequences. Hence, results for the first two rates and twenty hours of the third rate would appear in windows 16 of the first results sequence, and results for twenty hours of the third rate and the fourth and fifth rates would appear in windows 16 of the second results sequence. Such divisions of rates and sequences might be indicated on the index 5 by different colored vertical lines.

In operation the amount of wages for 38.7 hours at 87½¢ per hour would be obtained by placing peg-key 101 in hole 6 numbered 38 in fourth column of the index and depressing lever 14 for column 7 in the first results sequence, whereby the first index window would show 38 hours, column 7 would indicate .7 hour, and result would show in column 7 window 16 as $33.86. The amount of wages for 26.5 hours at $1.125 per hour would be obtained by placing peg-key 101 in hole 6 numbered 26 in eleventh column of the index and depressing lever 14 for column 5 in the second results sequence, the second index window would show 26 hours, column 5 would indicate .5 hour, and result would show in said column 5 window as $29.81.

Time and one half for overtime would be determined by converting actual hours worked to overtime hours and operating device as hereinbefore explained to obtain amount of wages. For example, 10.4 hours at time and one half would be 15.6 overtime hours, which at a rate of $1.125 per hour, for instance, would be $17.55, shown in window column 6 of the second results sequence.

It will be appreciated that a special feature of this device is that the table 19 and index 5 may be readily and quickly removed and replaced. Index 5 may be removed and replaced by removing screws 54 and 55, Figure 1. Table 19 may be removed and replaced by raising hinged case top 1, removing bar 103 by springing out of holes 102, and rotating drum 3. Thus, several different tables and accompanying indices might be used at various times on one machine when so desired. Likewise, obsolete tables and indices might be readily replaced with new ones.

In Sheet 2 of the drawing are shown several alternate details of construction to obtain varying advantages in operation of the device. It would be of considerable advantage to have individual keys for each index position, especially where window shutters are not desired, and an index plate assembly of this construction is shown in Figure 5 to Figure 10, inclusive.

Figure 8:
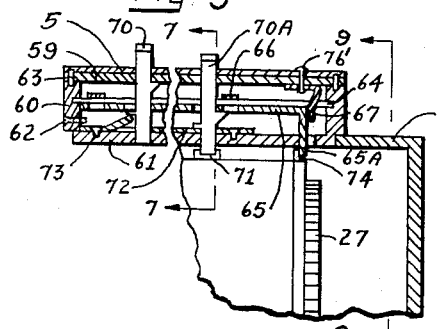
Figure 8 is a modification showing details of an index plate assembly having individual keys.
Figure 9:
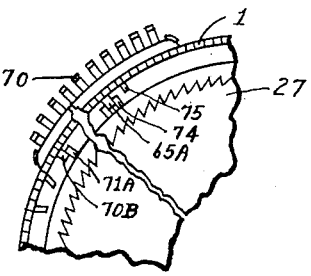
Figure 9 is a fragmentary end elevation approximately along the line 9—9 of Figure 8, with end of case removed.

A base 61 is fitted with a spring plate 72, punched to accommodate the keys and to provide an upturned spring for each key, as shown in Figure 8, said spring plate being secured to the base 61 by screws 73. A plate 65 is slidably mounted on rods 64 which are fitted into holes in the ends of index plate base 61, one end 60 of which is removable, being affixed to base 61 by screws 62. Index plate top 59 is positioned by pins 63, as is index 5 also, both being held in place by clamps 67' secured by screws 68. Plate 65 is held in normal position by spring 67 fastened to the plate 59 by rivets 76'.

In operation, key 70-A is depressed and the angled lug thereon bearing against edge of key hole in plate 65 forces extension 65-A to disengage drum latch 74, which releases drum 3 to turn. The top of angled lug on key 70-A then passing below plate 65, said plate 65 through action of spring 67 returns to normal position, retaining key 70-A in depressed position so that its extended end will engage the related stop A, B, C, etc., on drum 3. The normal position of key 70-A is indicated as 70.

Figure 10:
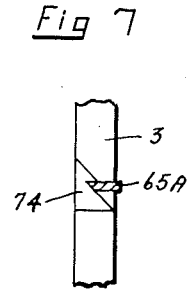
Figure 10 is a detail plan view, showing the drum latch stop associated with index plate assembly shown in Figure 8 and Figure 9.

Drum 3 and other operated parts are returned to normal position as hereinbefore described. As drum 3 revolves backward latch 74, which has high and low points as shown in Figure 10, engages extension 65-A and operates plate 65 to release depressed key 70-A which returns to normal position through action of spring 72. Stop 75 abutting against the low point of latch 74 limits backward movement of drum 3 so that plate extension 65-A will not over-ride the high point of latch 74. The high point of latch 74 imparts to plate 65 greater travel distance on reset than is caused by the operation of a key from normal position to release plate extension 65-A from the low point of latch 74. This greater travel distance of plate 65 on reset insures the positive release of an operated key 70-A to return to normal position.

The individual keys may be spaced vertically quite close together, as a sleeve designed to be attached to a pencil shaft or tip and having a short projection thereon may be used to depress the key it is desired to operate. The same pencil may be used to record the answers, and a slight, convenient shifting of the pencil without upending it suffices for its use in depressing a key. Likewise, a similar sleeve designed for use on a fingertip might be used for depressing the keys.

It may be here considered that a machine of this construction used on payroll calculations would be the most speedy means of obtaining wage results. By depressing only one key for hours worked in the proper rate section of the index, the result is located almost instantly by eye in the appropriate tenth-hour window, and the calculation is completed by one reset motion. Most conventional machines, for instance, operated to obtain the wage amount for 38.7 hours at 87½ cents per hour, would require three motions to set up 38.7 hours, three or four motions to register the factor of 87½ cents per hour, and a reset or clearing motion—a total of seven or eight motions. On this basis it is obvious that time-saving of approximately twenty five percent on any considerable volume of similar calculations would result from use of the method and device herein disclosed.

Figures 11, 12:
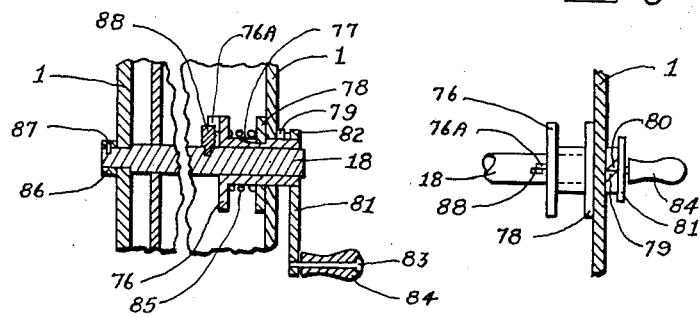
Figure 11 is a fragmentary vertical sectional detail showing optional crank-operated reset means.
Figure 12 is a fragmentary plan view of Figure 11.
Figure 13:
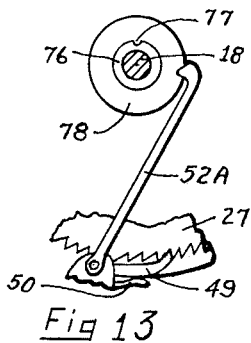
Figure 13 is a fragmentary vertical detail showing construction of ratchet gear pawl lock-out associated with optional reset means shown in Figure 11.

Figure 11, Figure 12 and Figure 13 show a crank means of accomplishing the reset operation in lieu of lever 44 and associated parts. Sleeve 76 has a lug 76-A which will engage lug 80 on shaft 19 at some point when crank 84 is turned clockwise, crank lever 81 being fastened to sleeve 76 by pin 82. Sleeve 76 is normally held in position by spring 85, but near the end of a revolution, angled lug 83 affixed to lever 81 engages angled lug 79 and forces sleeve 76 outward so that lug 76-A bypasses lug 80, being then in position for a subsequent resetting operation. In this construction the rotation of disc 78, which is slidably keyed to sleeve 76 at slot 77 forces lever 52-A outward and disengages pawl 49 from ratchet gear 27, allowing drum 3 to be reset by rotation backward.

It will be observed that a short space of drum rotation is required at the beginning of operation and at end of operation to allow for pawl disengagement, space occupied by reset lugs, and bypass of reset lugs. Therefore, normally the drum 3 circumference will be slightly greater than the table 19 length to allow these extra spaces. For instance, in the weekly wage bracket table for Withholding Income Tax, the table length is 84 spaces, whereas the index 5 and drum 3 are constructed for 90 spaces, and the stops A, B, C, etc., would be arranged in relation to the table 19 so that there would be blank table spaces at beginning and end of the table as aforesaid.

Figure 14:
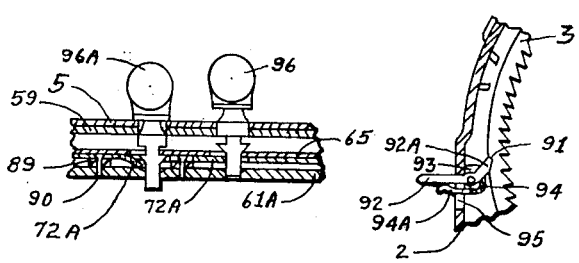
Figure 14 is a fragmentary vertical detail showing an optional peg-key operated index plate assembly.

Figure 14 illustrates an optional construction for automatic operation where the peg-key is used and window shutters are not desired. This is a modified type of the individual key construction, differing mainly in that spring plate 72-A is mounted directly under plate 65 on bolsters 89 and secured to base 61-A by rivets 90. A round peg-key 96 of appropriate shape as shown in Figure 14 is slotted and has an angled surface below the slot so that when inserted in an index position hole 6 of this construction the angled surface of peg-key 96 will operate plate 65 and extension 65-A to disengage latch 74, permitting drum 3 to revolve. The slot in peg-key 96 is engaged by plate 65, retaining it in depressed position as indicated by peg-key 96-A so that its extended end acts as a stop to engage the related stop A, B, C, etc. The reset operation moves plate 65 to release peg-key 96-A, which is returned to normal position by action of spring 72-A.

Figure 4:
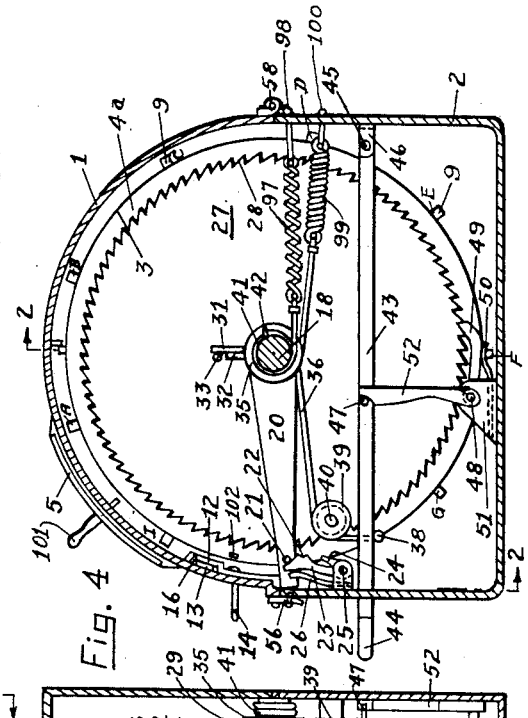
Figure 4 is an end view partly in section approximately on the line 4—4 of Figure 1, the end of the case being removed to show the operating parts.
Figure 15:
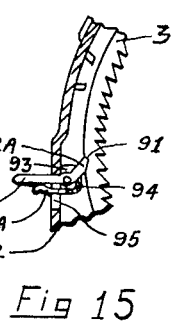
Figure 15 is a fragmentary vertical detail taken from Figure 4, modified to show an optional drum latch release means associated with simple peg-key index plate when column window shutters are not used.

Figure 15 shows a single latch release lever 92 and associated parts which may be used to latch and release drum 3 when it should be desired to use the plain index plate 7 and peg-key 101 as shown in Figure 3 and Figure 4, without using window shutters 12. Depressing lever 92 against action of spring 94-A disengages pawl 92-A from slot 91 in drum 3, permitting the drum 3 to revolve. Drum 3 is automatically locked in normal position when reset, as pawl 92-A engages slot 91 through action of spring 94-A, which is an extension of mounting bracket 94.

The vertical spacing on index 5 and table 10 may range from 6 to 9 lines per inch, which affords space sufficient for pica size typewriter characters in the 6 lines per inch spacing. Characters of a size within this range are quite readable, as the small size and light weight of the device permits it to be kept close to the operator. However, for better readability a magnifying glass may be installed extending over the windows 16 or openings so that the characters will be enlarged to the operator's sight.

There are suggested four basic combinations of construction as follows: First, the plain peg-key and index plate as shown in drawing on Sheet 1, using single latch release lever 92 as shown in Figure 15, and without window shutters 12. This combination is also adaptable to flat construction and hand operation. Second, the plain peg-key and index plate, with window shutters 12, and individual drum release levers 14, as shown in drawing Sheet 1. Third, the index plate with full complement of keys, or the peg-key index plate for simultaneous latch release as shown in Figure 14, and no window shutters 12. Fourth, the index plate with full complement of keys, or the peg-key index plate for simultaneous latch release as shown in Figure 14, with window shutters 12 and individual window shutter operating levers 14, as shown.

From the foregoing it will be seen that there has been herein disclosed a low-cost calculating method and apparatus which, although limited in capacity, may be practically adapted to show the results of a wide variety of specially selected problems, more efficiently and economically than has been heretofore provided. In short, for various applications the method and device presents multiple advantages as to initial cost and cost of operations savings in comparison with other means costing many times more. In view of the comparatively low cost of manufacturing this device its limited capacity may in many instances be greatly enlarged or extended by the use of several machines, i. e., as many as might be required to provide the full range of factors encountered in an application. Many payrolls are grouped by rates, and in cases where there are large numbers of employees a payroll department may have several sections. It is quite practical in such instances that several machines, each with five rates capacity, equipped with tables for different combinations of rates, would cover the range of most of the entire payroll.

It will be understood that the method herein disclosed may be embodied in various forms of apparatus, and that consequently index means, movable means, and other parts herein referred to may be flat or cylindrical, slidable or rotatable, and may be performed by hand or mechanically. Hence, this method constitutes a process whereby heretofore slower methods of determining answers to mathematical calculations may be accelerated and more conveniently performed. The essential apparatus involved in the method herein disclosed is an index plate carrying an index, index key(s) or stop(s), and movable means having stops located thereon at intervals and adapted to carry a table. With flat apparatus, the method could be performed by hand by operating an index key or stop and sliding the movable means carrying a table until further movement should be stopped by the index key obstructing a corresponding stop on said movable means, the answers appearing at the lower portion of the index plate. It is also understood that the flat apparatus might be adapted to be operated mechanically, in which event such apparatus would be mechanically equivalent in practically every respect to the cylindrical form used as illustrative in this application.

Therefore, while there have been disclosed in this specification a specific form in which the invention may be embodied, with several modifications in details, it is to be understood that this form is shown for the purpose of illustration only, and that the invention is not to be limited to the specific disclosures but may be modified and embodied in various other forms without departing from its spirit. As a matter of fact, the invention includes all the modifications and embodiments coming within the scope of the following claims.

Having thus fully described the invention, what is claimed as new, and for which it is desired to secure Letters Patent, is:

1. In a selector of the character described, a case, an index plate having a plurality of position-holes therein mounted on said case and adapted to carry an index, movable means adapted to carry a table mounted within said case and having a plurality of fixed stops disposed thereon, said index plate position-holes being disposed in columns vertical to the axis of said movable means, whereby the said position-holes in a column are correlative to a common said fixed stop on said movable means, said movable means being so mounted that the surface thereof is in a plane adjacent to and normally beneath said index plate, the said index plate normally being so mounted as not to extend beyond the ends of said movable means, and key-stop means adapted to be operative in the position-holes of said index plate, whereby a key-stop means operated in any position-hole of said index plate will project into the path of a related said fixed stop on said movable means limiting the movement of said movable means to a precise predetermined position the said fixed stop engaged by a said operated key-stop means and the primary position of said movable means selected thereby being determined by the column of said index plate in which said key-stop means is operated, and the secondary position of said movable means being determined by the position said operated key-stop means occupies between the vertical extremes of said column.

2. In a selector of the character described, a case having a plurality of apertures therein, an index plate having a plurality of position-holes therein mounted on said case, an index of suitable characters mounted on said index plate and having holes therein registering with the said position-holes of said index plate, movable means mounted within said case and having a plurality of fixed stops disposed thereon, a table of suitable characters mounted on said movable means and having holes therein through which the said fixed stops on said movable means extend, said index plate position-holes and the characters on said index being disposed in columns vertical to the axis of said movable means, whereby the said position-holes and the said characters in a column are correlative to a common said fixed stop on said movable means, said movable means being so mounted that the surface thereof is in a plane adjacent to and normally beneath said index plate, the said index plate normally being so mounted as not to extend beyond the ends of said movable means, and key-stop means adapted to be operative in the position-holes of said index plate, whereby a key-stop means operated in a said index plate position-hole will project into the path of a related said fixed stop on said movable means limiting the movement of said movable means to a precise predetermined position and thus exposing to view through the apertures in said case the predetermined and selected characters of said table occupying said precise predetermined position on said movable means the said fixed stop engaged by a said operated key-stop means and the primary position of said movable means selected thereby being determined by the column of said index plate in which said key-stop means is operated, and the secondary position of said movable means being determined by the position said operated key-stop means occupies between the vertical extremes of said column.

3. A selector in accordance with claim 1, including actuating means for moving said movable means, and locking detent means for retaining said movable means in normal position.

4. A selector in accordance with claim 1, including rebound detent means for controlling rebound of actuated said movable means.

5. A selector in accordance with claim 1, including means for simultaneously releasing said rebound detent means, resetting said movable means to normal position, and resetting said key-stop means.

6. A selector in accordance with claim 1, in which said key-stop means comprises a removable peg-key operative selectively in any of said index plate position-holes.

7. A selector in accordance with claim 1, in which said key-stop means comprise a plurality of key-stops which constitute a separate key-stop for each of the said index plate position-holes.

8. A selector in accordance with claim 1, including coincidental means operative by said key-stop means for simultaneously releasing said locking detent means and retaining said key-stop means in operated position, and in conjunction with simultaneous reset means operative to relock said locking detent means for retaining said movable means in normal position and release said key-stop means for returning to normal position.

9. A selector in accordance with claim 2, including actuating means for moving said movable means, and locking detent means for retaining said movable means in normal position.

10. A selector in accordance with claim 2, including rebound detent means for controlling rebound of actuated said movable means.

11. A selector in accordance with claim 2, including means for simultaneously releasing said rebound detent means, resetting said movable means to normal position, and resetting said key-stop means.

12. A selector in accordance with claim 2, in which said key-stop means comprises a removable peg-key operative selectively in any of said index plate position-holes.

13. A selector in accordance with claim 2, in which said key-stop means comprise a plurality of key-stops which constitute a separate key-stop for each of said index plate position-holes.

14. A selector in accordance with claim 2, including coincidental means operative by said key-stop means for simultaneously releasing said locking detent means and retaining said key-stop means in operated position, and in conjunction with simultaneous reset means operative to relock said locking detent means for retaining said movable means in normal position and release said key-stop means for returning to normal position.

JONES B. EDWARDS.

REFERENCES CITED

The following references are of record in the file of this patent:

UNITED STATES PATENTS

| Number | Name | Date |
|---|---|---|
| 457,726 | Kolb | Aug. 11, 1891 |
| 659,835 | Thomas | Oct. 16, 1900 |
| 703,188 | Dement | June 24, 1902 |
| 809,479 | Warner | Jan. 8, 1906 |
| 964,296 | Moe | July 12, 1910 |
| 971,865 | Stocklmier | Oct. 4, 1910 |
| 1,215,219 | Trinks | Feb. 6, 1917 |
| 2,381,424 | Danielson | Aug. 7, 1945 |
| 2,480,228 | Diamond | Aug. 30, 1949 |